(No Model.)

G. ROTH.
CANDLE MACHINE.

No. 314,347. Patented Mar. 24, 1885.

WITNESSES:
L. Cook
C. Sedgwick

INVENTOR:
G. Roth
BY Munn & Co
ATTORNEYS.

UNITED STATES PATENT OFFICE.

GREGORY ROTH, OF CINCINNATI, OHIO.

CANDLE-MACHINE.

SPECIFICATION forming part of Letters Patent No. 314,347, dated March 24, 1885.

Application filed October 14, 1884. (No model.)

*To all whom it may concern:*

Be it known that I, GREGORY ROTH, of Cincinnati, in the county of Hamilton and State of Ohio, have invented a new and Improved Candle-Machine, of which the following is a full, clear, and exact description.

The object of my invention is the saving of wick and the keeping of the stearine or other material free from the impurities caused by the remelting of the portion of the candle usually cut off with the wick.

The invention consists in the combination, together and with a candle-machine, of wick-spools and tightening-rollers, whereby the wick can be drawn tight previous to the molding of the candles, and also drawn through the molded candle, so as to save the cutting off, as hereinafter described and claimed.

Reference is to be had to the accompanying drawings, forming a part of this specification, in which similar letters of reference indicate corresponding parts in both the figures.

Figure 1:
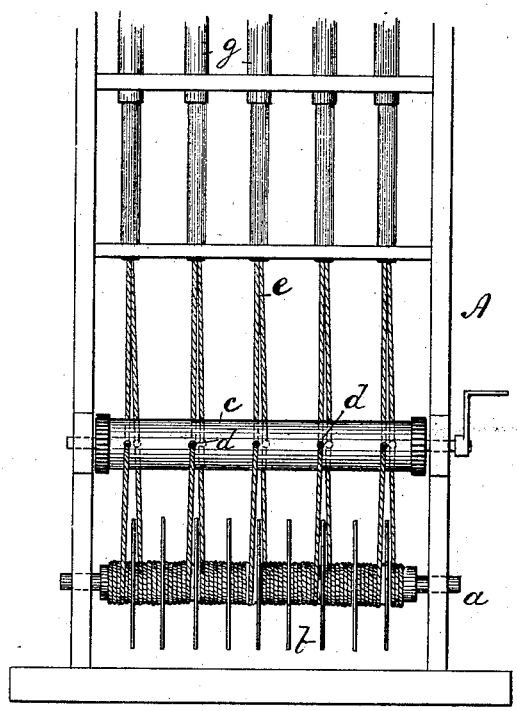
Figure 2:
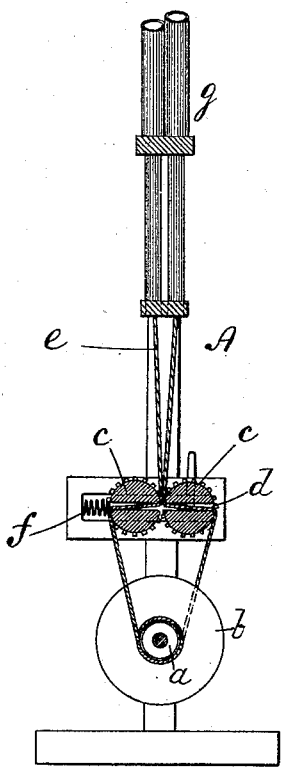

Figure 1 is a front elevation of a candle-machine provided with my improvements. Fig. 2 is a vertical transverse section of the same.

A is the frame of the machine, which may contain any number of molds.

My improvements are applied in connection with a double row of molds, as follows: In the lower part of the frame is a shaft, $a$, which is provided with disks $b$, so as to form a series of spools upon which the wicks are wound. Above the spools and on the frame two rollers, $c\ c$, are journaled side by side and geared together at their ends, and these rollers are formed, as shown at $d$, with transverse holes, through which the wicks represented at $e$ pass. One of the rollers $c$ is fitted in horizontally-sliding bearings and the boxes provided with springs, $f$, which serve to press the gearing into contact, and the shaft of this same roller is provided with a crank-handle for use in turning the rollers. The wicks pass from the spools through the transverse holes of the rollers $c$ and thence upward into the molds $g$. When the two rollers are turned to bring the holes into the vertical position, the wicks can be freely drawn through from the spools to the extent desired and fastened, ready for molding the candles. Then, by giving the rollers a slight movement toward each other, the wicks will be stretched, and thus held while the candles are molded, and then, while the material is still warm in the molds, the roller is to be turned farther, so as to draw the wicks down and stretch them, thereby taking up the inch or more of wick which is usually cut off with a portion of the candle. By these means the length of wick usually cut off and wasted is saved, and the portion of the candle that may be cut off, having no wick in it, does not render the mass of material impure when remelted. The candle produced is also superior by reason of its having a stretched wick, and the wick is more accurately placed in the center of the candle by being stretched before molding.

I do not limit myself in respect to the form of spools used, as the ordinary spool may be used as well as the form shown.

Having thus described my invention, I claim as new and desire to secure by Letters Patent—

1. In a candle-machine, a roller or rollers fitted between the wick-spools and molds, and carrying the wicks in such a manner that by turning the roller or rollers the wicks are stretched, substantially as described.

2. The combination, in a candle-machine, with the wick-spools and molds, of a pair of rollers, $c$, formed with transverse apertures, for use in the manner specified, for stretching and drawing the wick.

3. The combination, with a candle-machine, of the molds $g$, the transversely-apertured rollers $c$, and the wick-spools formed by the shaft $a$ and the disks $b$, substantially as described.

GREGORY ROTH.

Witnesses:
EMIL HOFFMANN,
W. W. LYMMES.